March 30, 1926.
J. H. BARD
GATE
Filed July 16, 1924
1,578,795
2 Sheets-Sheet 1
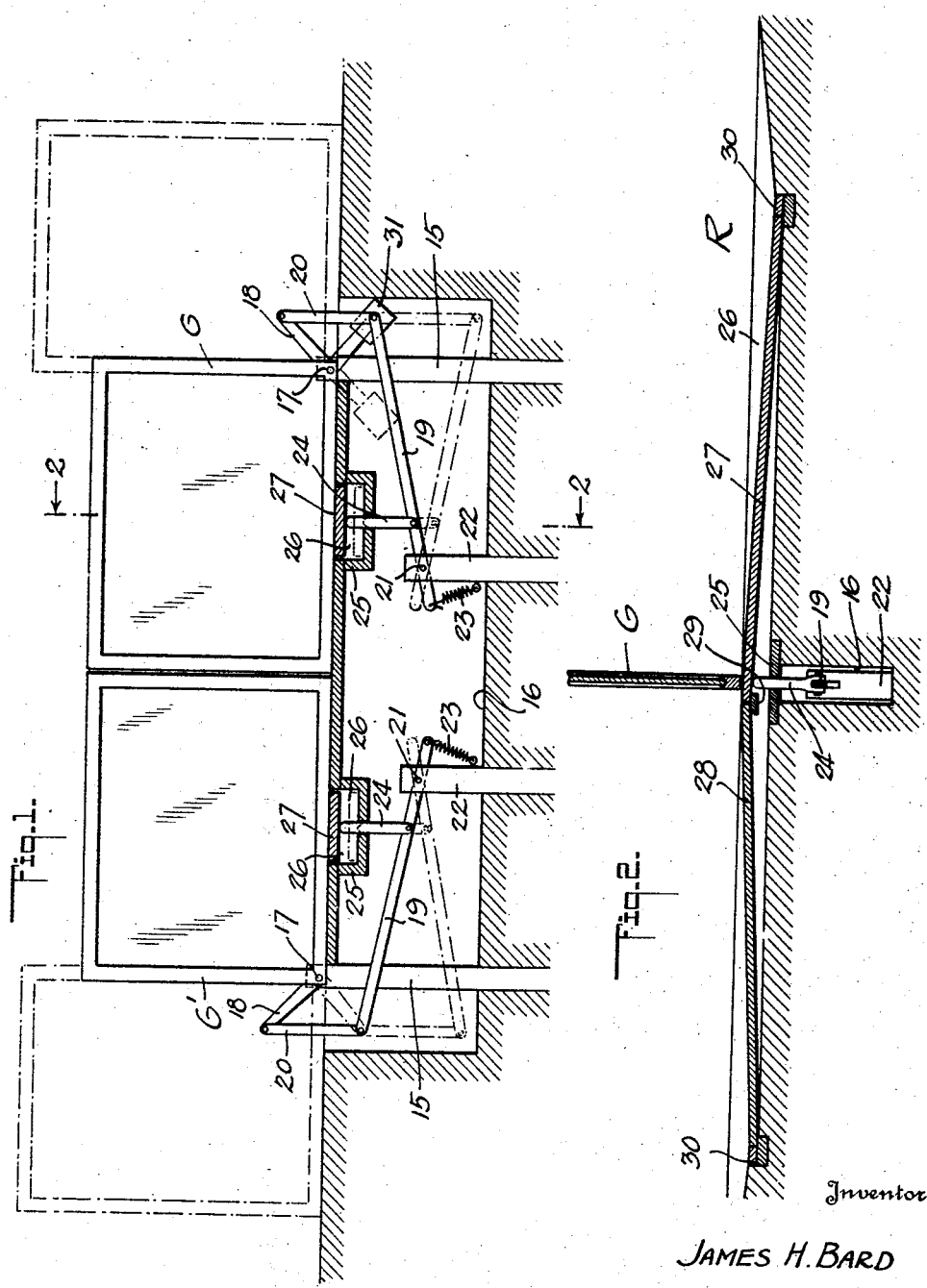
Inventor
JAMES H. BARD
By Munn & Co.
Attorneys March 30, 1926.  1,578,795
J. H. BARD
GATE
Filed July 16, 1924  2 Sheets-Sheet 2
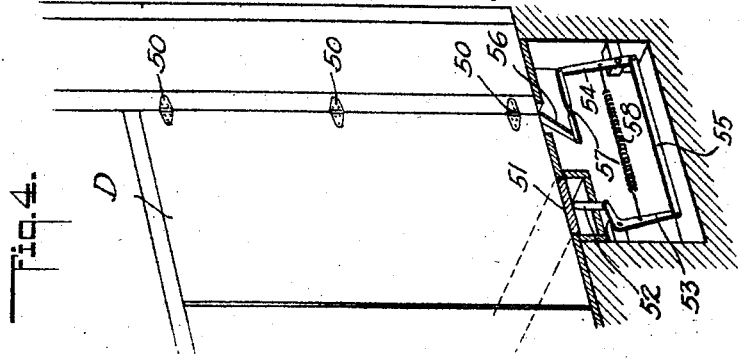
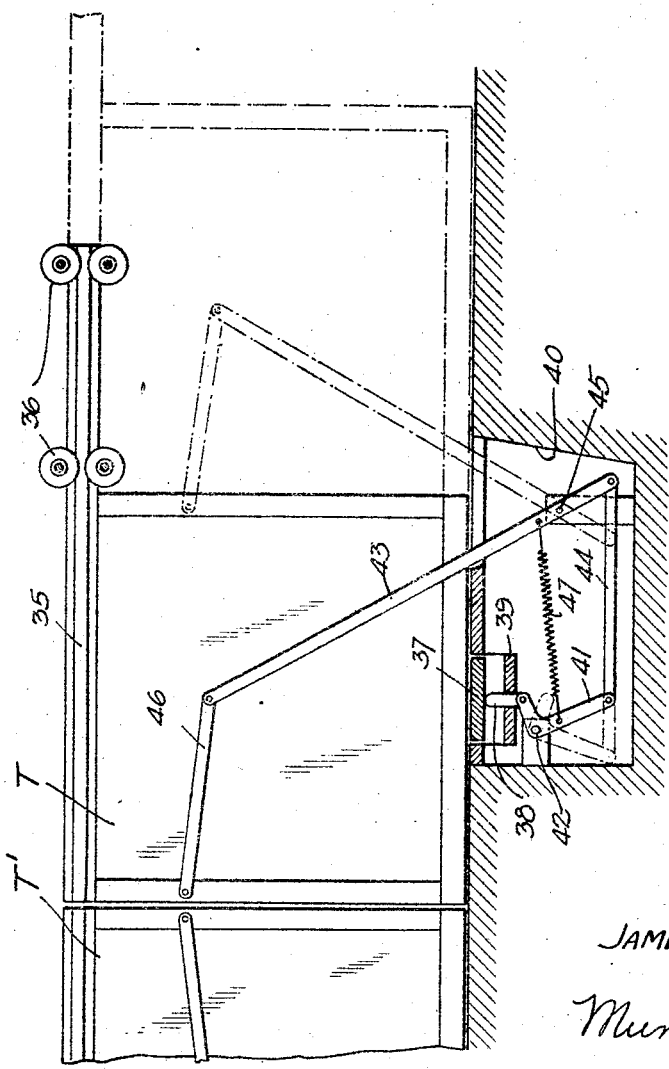
Inventor
JAMES H. BARD
Munn & Co.
Attorneys Patented Mar. 30, 1926.

1,578,795

UNITED STATES PATENT OFFICE.

JAMES HOLMES BARD, OF BELL, CALIFORNIA.

GATE.

Application filed July 16, 1924. Serial No. 726,376.

*To all whom it may concern:*

Be it known that I, JAMES H. BARD, a citizen of the United States, and a resident of Bell, in the county of Los Angeles and State of California, have invented certain new and useful Improvements in Gates, of which the following is a specification.

My invention relates to gates, doors and similar closures, and a purpose of my invention is the provision of a gate having mechanism adapted to be operated by a vehicle approaching the gate to effect the automatic opening thereof, and in such manner that when the vehicle has passed through the gate the mechanism will operate to automatically return the gate to closed position.

It is also a purpose of my invention to provide a gate operating mechanism which, in addition to being simple, inexpensive and effective in operation, is adaptable to vertically swinging gates, horizontally sliding gates and vertically pivoted gates.

I will describe three forms of gate each embodying my invention, and will then point out the novel features thereof in claims.

In the accompanying drawings

Figure 1 is a view showing in side elevation, and partly in section, one form of gate and operating mechanism embodying my invention;

Figure 2 is a vertical sectional view taken on the line 2—2 of Figure 1;

Figure 3 is a view similar to Figure 2, showing another form of gate and operating mechanism embodying my invention;

Figure 4 is a fragmentary perspective view, partly in section, showing a third form of gate and operating mechanism embodying my invention.

Similar reference characters refer to similar parts in each of the several views.

Referring specifically to the drawings, and particularly to Figures 1 and 2, I have here shown a gate of the vertically swinging type, including two gate sections G and G'. In the closed position of the gate sections G and G$^s$, as illustrated in solid lines in Figure 1, they are disposed in intersecting relation to a roadway R, and by means of suitable mechanism the gate sections are adapted to be swung upwardly and outwardly in opposite directions to the open position shown in dot and dash lines in Figure 1. As the mechanisms for actuating the gate sections are identical, a description of one will suffice for both.

The mechanism for the gate section G in the present instance comprises a standard 15 extending upwardly within a pocket or well 16 formed in and extending transversely of the roadway R. The gate section G is pivoted at the point indicated at 17 upon the upper end of the standard 15, and rigidly connected to the pivot of the gate is an arm 18 connected to a lever 19 by a link 20. The lever 19 is fulcrumed at the point indicated at 21 to a standard 22, and a spring 23 is connected to the lower end of the lever 19 for normally urging the upper end carrying the link 20 upwardly into the position shown in Figure 1. An actuating bar 24 is pivotally connected to the lever 19 and extends upwardly through a slot formed in a bridge member 25, which, as shown in Figure 1, is U-shaped in cross section and is shown in Figure 2 in bridging relation to the well or pocket 16. The bridge member 25 is disposed substantially medially of a trough 26 formed in the roadway R, and in this trough are mounted actuating platforms 27 and 28, the two being arranged in end to end relation and having their confronting ends operatively connected by a cross bar 29 which is secured to the under side of one of the platforms so as to provide a ledge upon which the end of the other platform is adapted to repose. The outer end of the platforms engage abutments 30 which limit the movement of the platforms outwardly with respect to the gate. As shown in Figure 2, the platform 27 reposes on the upper end of the actuating bar 24 so that when the platform is depressed a downward movement of the actuating bar is effected. It will be noted that the actuating bar 24 is positively guided in its movement by virtue of its passage through the slot in the bridge member 25; thus it will at all times be positioned to be actuated upon depression of the platforms 27 and 28.

It will be understood that the roadway

R is provided with two troughs 26, one being provided for each of the gate sections G and G', and two platforms 27 and 28 are disposed within each of the troughs, the troughs being spaced apart a distance sufficiently to accommodate the wheels of a vehicle so that the wheels of a vehicle traversing the roadway will ride upon the platforms 27 or 28, depending upon in which direction the vehicle is approaching the gate.

In order to insure proper operation of the mechanism for elevating the gate sections, I have provided counter-weights 31 which are secured to the pivots 17 so as to urge the gates to open position and to tend to operate the mechanism to close the gate sections when the latter are in open position.

In operation, the wheels of a vehicle approaching the gate, say over the platforms 27, the platforms will be depressed to lower the actuating bars 24, thereby moving the levers 19 to the dotted line position shown in Figure 1. During the downward movement of the levers the arms 18 are rocked downwardly to elevate the gate sections G and G' and to swing the latter outwardly to the open position shown. In the open position the weights 31 operate to urge the gate sections back to closed position as has been described, but as long as the vehicle remains upon the platform the return of the gate sections to closed position is prevented. As the vehicle passes from the platforms 27 on to the platforms 28 through the operative connection provided by the bar 29, the actuating bars 24 are maintained in depressed position so that the gate sections are retained in open position until the vehicle completely passes off of the platforms 28.

Referring now to Figure 3, I have herein shown another form of gate and actuating mechanism embodying my invention, in which the gate is made up of two sections T and T' mounted for horizontal sliding movement by means of tracks 35 which move on rollers 36. As in the first embodiment of my invention, two gate sections T and T' are each provided with actuating mechanism for moving the gates to open and closed position, and as the two mechanisms are identical a description of one will suffice for both. A platform 37 is movable by the wheels of a vehicle to depress an actuating bar 38 movable through a bridging member 39, the member being arranged in bridging relation to a pocket or well 40. The actuating bar 38 is connected to a bell crank lever 44 fulcrumed at the point indicated at 42 and pivotally connected to a lever 43 through a link 44. The lever 43 is fulcrumed at the point indicated at 45, and the long arm of the lever is pivotally connected to a link 46 pivotally secured to the meeting edge of the corresponding gate section T. A spring 47 connects the bell crank lever 41 and the lever 43 to normally urge the lever to the position shown in Figure 3, so that when the gate section is in open position, as indicated in dash lines in Figure 3, the spring will act on the lever to return the gate section to closed position.

In operation, the gate section is moved to open position by a depression of the platform 37 which actuates the bar 38 to rock the bell crank lever 41 to the dotted line position shown, wherein the lever 43 is swung to the right to move the door section to open position. During the movement of the lever the spring 47 is placed under tension so that when the vehicle rides off of the platform 37, the actuating bar 38 is free to move upwardly to allow the spring to return the lever 43 to normal position.

Referring now to Figure 4, I have here shown a third embodiment of my invention, in which D designates a section of a door or gate pivoted to swing about a vertical axis by means of hinges 50. A platform 51, similar to the platforms 27 and 37, is adapted to actuate the actuating bar 52 connected to a bell crank lever 53 for actuating a lever 54 through a link 55. The lever 54 is operatively connected to an arm 56 through a link 57, and the arm 56 is secured to the door section so as to swing with the latter. A spring 58 connects the levers 53 and 54 and functions to urge the door section to closed position in a manner similar to the spring 47.

In operation, a depression of the platform 51 actuates the mechanism to throw the arm 56 outwardly in such manner as to swing the door section D to open position. The spring 58 serves to actuate the mechanism in returning the door section to closed position after the vehicle has passed off of the platform 51.

Although I have herein shown and described only three forms of gates and actuating mechanisms therefor, all embodying my invention, it is to be understood that various changes and modifications may be made herein without departing from the spirit of the invention and the spirit and scope of the appended claims.

What I claim is:

1. In combination, a trough adapted to span a well disposed transversely of a roadway, platforms in the trough movable to be depressed by a vehicle passing thereover, a gate extending transversely of the trough and pivoted to swing about a horizontal axis, a lever fixed to the gate at the axis of the gate, a counterweight having an arm fixed to the gate, a link pivotally connected to the lever, a standard fixed in the well, a second lever pivoted on the standard and connected to the link, a spring connected to said second lever and standard for urging said levers to a position in which the gate is closed, and an actuating bar pivoted on the second lever and extending upwardly into the trough so as to be depressed by said platforms, whereby said levers will be actuated to open said gate against the action of said spring.

2. The combination as embodied in claim 1 wherein said actuating bar extends upwardly through an opening formed in the through so as to be guided for movement by the latter and to directly engage the under surface of one of the platforms.

JAMES HOLMES BARD.